(12) United States Patent
Lee

(10) Patent No.: US 8,714,127 B2
(45) Date of Patent: May 6, 2014

(54) BALANCE SHAFT MODULE OF ENGINE

(75) Inventor: Ahn Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/495,579

(22) Filed: Jun. 13, 2012

(65) Prior Publication Data

US 2013/0118436 A1 May 16, 2013

(30) Foreign Application Priority Data

Nov. 16, 2011 (KR) ........................ 10-2011-0119425

(51) Int. Cl.
*F02B 75/06* (2006.01)

(52) U.S. Cl.
USPC .................................... 123/192.2; 123/192.1

(58) Field of Classification Search
USPC ............................ 123/192.2; 418/201.1, 151, 418/206.1–206.8
See application file for complete search history.

(56) References Cited

U.S. PATENT DOCUMENTS

| | | | |
|---|---|---|---|
| 7,017,545 B2 * | 3/2006 | Sato et al. .................... | 123/192.2 |
| 7,252,066 B2 * | 8/2007 | Hamilton .................... | 123/192.2 |
| 7,559,308 B2 * | 7/2009 | Matsuda et al. ........... | 123/197.1 |
| 2004/0045520 A1 * | 3/2004 | Slopsema et al. .......... | 123/192.2 |
| 2009/0016907 A1 * | 1/2009 | Williamson et al. .......... | 417/365 |
| 2009/0129959 A1 | 5/2009 | Cho et al. | |

FOREIGN PATENT DOCUMENTS

| | | |
|---|---|---|
| EP | 1 081 410 B1 | 12/2002 |
| JP | 2011-43189 A | 3/2011 |
| KR | 10-2003-0030116 A | 4/2003 |
| KR | 10-2006-0126523 A | 12/2006 |
| KR | 10-2008-0055049 A | 6/2008 |
| KR | 10-2009-0064097 A | 6/2009 |
| KR | 10-0936977 B1 | 1/2010 |

* cited by examiner

*Primary Examiner* — Noah Kamen
*Assistant Examiner* — Long T Tran
(74) *Attorney, Agent, or Firm* — Morgan, Lewis & Bockius LLP

(57) ABSTRACT

A balance shaft module of an engine, may include a crank sprocket driving gear for receiving a power of a crankshaft of the engine, a crank sprocket driven gear engaged with the crank sprocket driving gear and receiving a power of the crank sprocket driving gear, a first balance shaft arranged coaxially with the crank sprocket driven gear and having a first driving gear to receive a power from the crank sprocket driven gear, and a second balance shaft receiving a power through a second driven gear engaged with the first driving gear.

7 Claims, 6 Drawing Sheets

BALANCE SHAFT MODULE OF ENGINE

CROSS-REFERENCE TO RELATED APPLICATIONS

The present application claims priority to Korean Patent Application Number 10-2011-0119425 filed Nov. 16, 2011, the entire contents of which application is incorporated herein for all purposes by this reference.

BACKGROUND OF THE INVENTION

1. Field of the Invention

The present invention relates to a balance shaft module of an engine, and more particularly, to a balance shaft module of an engine capable of minimizing an installation volume.

2. Description of Related Art

In general, crankshafts of an engine are arranged in a single-plane crankshaft type where eight crankshafts are disposed on one plane as shown in FIG. 1.

That is, in the case of a V8-90 degree eight-cylinder V engine with a single-plane crankshaft type, two balance shafts for offsetting a secondary unbalance force and an unbalance moment should be installed between the crank bottom and a cylinder bank, and driven at double speed.

A balancing design for an unbalance force and an unbalance moment, which are caused by a piston performing a reciprocating motion and a connecting rod performing a swinging motion, is required for the engine.

In the case of the connecting rod, a calculation formula is used to consider a lumped mass, in order to discriminate a reciprocating mass connected to the piston and a rotating mass connected to a crank pin.

The reciprocating mass and the rotating mass have inertia, which generate inertia forces as the engine is driven.

The reciprocating inertia force caused by the reciprocating mass generates an inertia force in the same direction as the central axis of a cylinder, and the inertia force caused by the rotating mass generates an inertia force in the direction of a crank pin, which corresponds to the radial direction of the rotation.

The above-described inertia forces are represented by different unbalance components for each engine type.

In particular, when a 90-degree cylinder bank angle and a single-plane crankshaft type are applied to the V8 engine, a secondary horizontal excitation force and a secondary pitching moment occur. Further, one balance shaft rotating at double speed in the same direction as the crankshaft and one balance shaft rotating at double speed in the opposite direction of the crankshaft are installed at the bottom of the crankshaft, in order to offset the unbalance components.

However, the two balance shafts should be installed on the same perpendicular plane as the crankshaft. Further, since a distance between the crankshaft installation portions is large, there is a limit to the balance shaft installation layout, and it is impossible to implement a compact construction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a balance shaft module of an engine, which is capable of minimizing the volume of a balance shaft of an eight-cylinder V engine.

In an aspect of the present invention, a balance shaft module of an engine, may include a crank sprocket driving gear for receiving a power of a crankshaft of the engine, a crank sprocket driven gear engaged with the crank sprocket driving gear and receiving a power of the crank sprocket driving gear, a first balance shaft arranged coaxially with the crank sprocket driven gear and having a first driving gear to receive a power from the crank sprocket driven gear, and a second balance shaft receiving a power through a second driven gear engaged with the first driving gear.

A rotation speed of the crank sprocket driven gear is twice higher than that of the crank sprocket driving gear.

Virtual extension lines joining each rotation center of the first balance shaft, the second balance shaft, and the crank sprocket driving gear form an isosceles triangle.

A distance between the rotation centers of the first balance shaft and the crank sprocket driving gear is equal to a distance between the rotation centers of the second balance shaft and the crank sprocket driving gear.

A distance between the rotation centers of the first balance shaft and the second balance shaft is shorter than the distance between the rotation centers of the first balance shaft and the crank sprocket driving gear.

A first balance weight element is mounted on the first balance shaft and may include first, second and third weight elements, wherein a second balance weight element is mounted on the second balance shaft and may include fourth, fifth and sixth weight elements, and wherein the first, second and third weight elements may have a phase difference of 180 degrees with the fourth, fifth and sixth weight elements respectively.

The first, second and third weight elements may have a phase difference of 90 degrees in sequence.

The fourth, fifth and sixth weight elements may have a phase difference of 90 degrees in sequence.

The first and second balance shafts are disposed at a side surface of a cylinder block.

The crank sprocket driving gear and the crank sprocket driven gear are connected through a chain member or a belt member.

According to the exemplary embodiments of the present invention, the balance shaft module of the engine may minimize the volume of a balance shaft of an eight-cylinder V engine, and simplify the structure.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
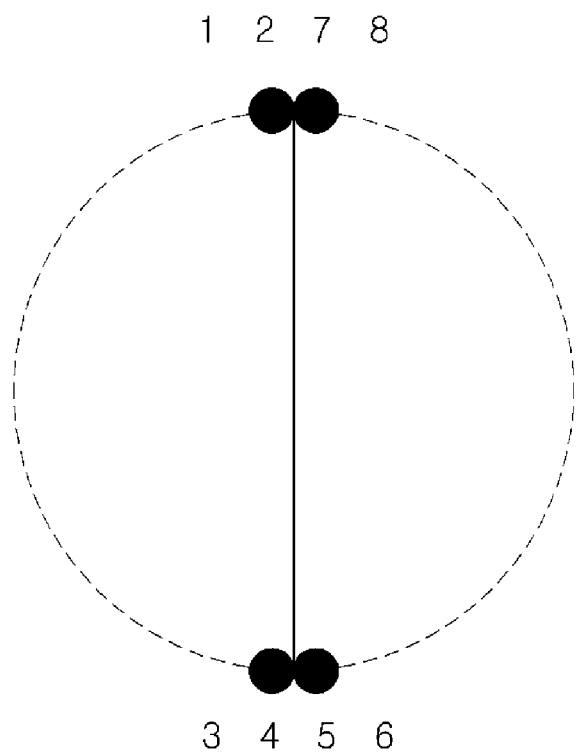
FIG. 1 schematically shows a single-plane crankshaft type which is generally applied and in which eight crankshafts are arranged on one plane.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiments of the present invention will be described in detail with reference to the accompanying drawings.

Figure 2:
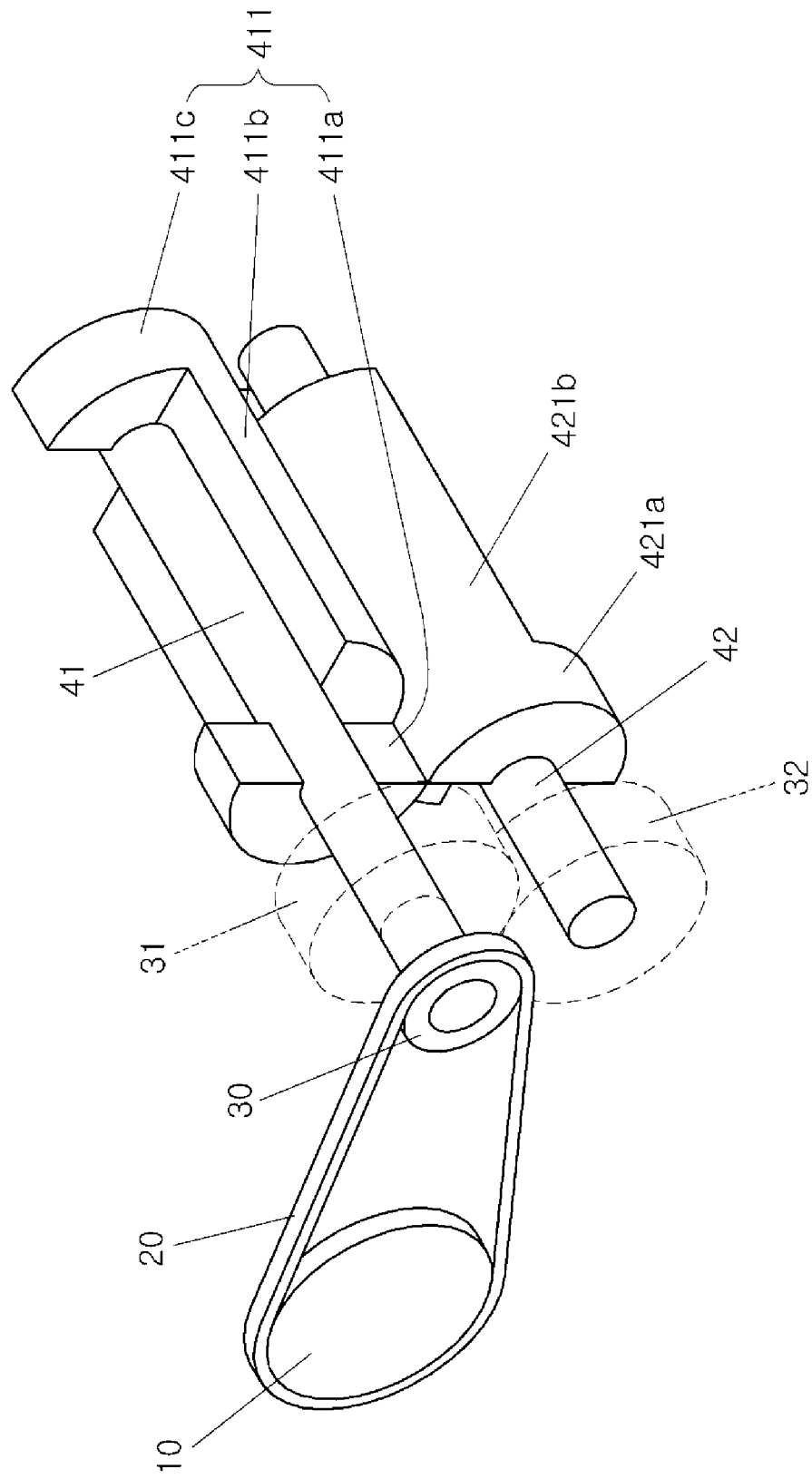
FIG. 2 is a perspective view of a balance shaft module of an engine according to an exemplary embodiment of the present invention.
Figure 3:
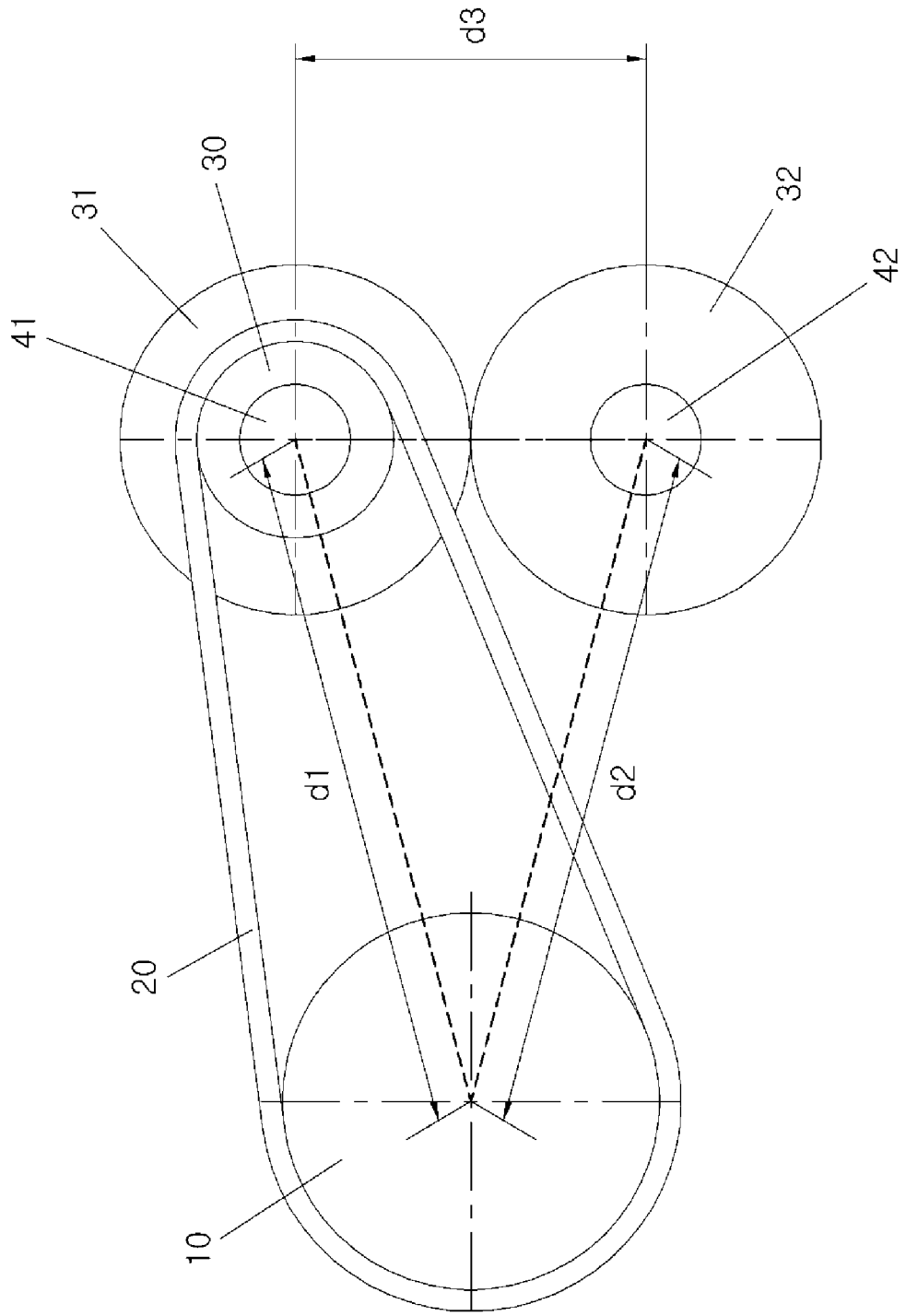
FIG. 3 is a side view of the balance shaft module of the engine according to the exemplary embodiment of the present invention.

FIG. 2 is a perspective view of a balance shaft module of an engine according to an exemplary embodiment of the present invention, and FIG. 3 is a side view of the balance shaft module of the engine according to the exemplary embodiment of the present invention. As illustrated in FIGS. 2 and 3, the balance shaft module according to the exemplary embodiment of the present invention includes a crank sprocket driving gear 10, a crank sprocket driven gear 30, a first balance shaft 41, and a second balance shaft 42. Crank sprocket driving gear 10 receives power of the engine. Crank sprocket driven gear 30 receives the power of crank sprocket driving gear 10 through a chain member 20. First balance shaft 41 is disposed on the same axis as crank sprocket driven gear 30 and receives the power. Second balance shaft 42 is disposed to receive the power of first balance shaft 41.

Crank sprocket driving gear 10 is installed to directly receive engine power outputted from a crankshaft of the engine. Chain member 20 is disposed to surround the outer circumference of crank sprocket driven gear 30 and transmits the power, and the power of crank sprocket driving gear 10 is transmitted to crank sprocket driven gear 30, which will be described below, by chain member 20.

First balance shaft 41 includes a first balance weight 411 formed on the outer circumference thereof, first balance weight 411 including a plurality of first balance weight elements 411a, 411b, and 411c. Second balance shaft 42 includes a second balance weight 421 formed on the outer circumference thereof, second balance weight 421 including a plurality of second balance weight elements 421a, 421b, and 421c.

First balance shaft 41 is disposed on the same axis as crank sprocket driven gear 30. The power of crank sprocket driving gear 10 is transmitted to crank sprocket driven gear 30 through chain member 20, and then transmitted to first balance shaft 41 by crank sprocket driven gear 30. Here, a first driving gear 31 is disposed on the same axis as crank sprocket driven gear 30, and first balance shaft 41 and crank sprocket driven gear 30 are integrally rotated by first driving gear 31.

A second driving gear 32 is provided to be engaged with first driving gear 31. Similarly, second driving gear 32 is disposed on the same axis as second balance shaft 42 and transmits the power of first driving gear 31 to second balance shaft 42 through second driving gear 32.

First and second driving gears 31 and 32 have a gear ratio two times higher than the rotation speed of crank sprocket driving gear 10. That is, when crank sprocket driving gear 10 is rotated, first balance shaft 41 is rotated two times in the same direction as crank sprocket driving gear 10, and second balance shaft 42 is rotated two times in the opposite direction. First balance shaft 41 is rotated in the opposite direction of second balance shaft 42. In addition, virtual extension lines among the rotation centers of first balance shaft 41, second balance shaft 42, and crank sprocket driving gear 10 form an isosceles triangle.

That is, a distance d1 between crank sprocket driving gear 10 and first balance shaft 41 is equal to a distance d2 between crank sprocket driving gear 10 and second balance shaft 42, and a distance d3 between first and second balance shafts 41 and 42 is smaller than distances d1 and d2.

Figure 4A:
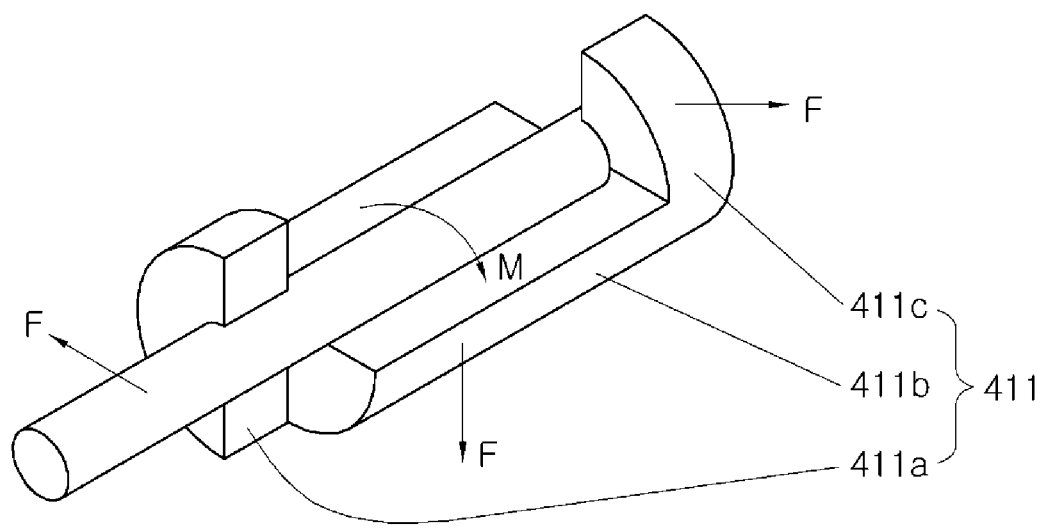
FIGS. 4A and 4B are perspective views of the first and second balance shafts which are applied to the balance shaft module of the engine according to the exemplary embodiment of the present invention.
Figure 4B:
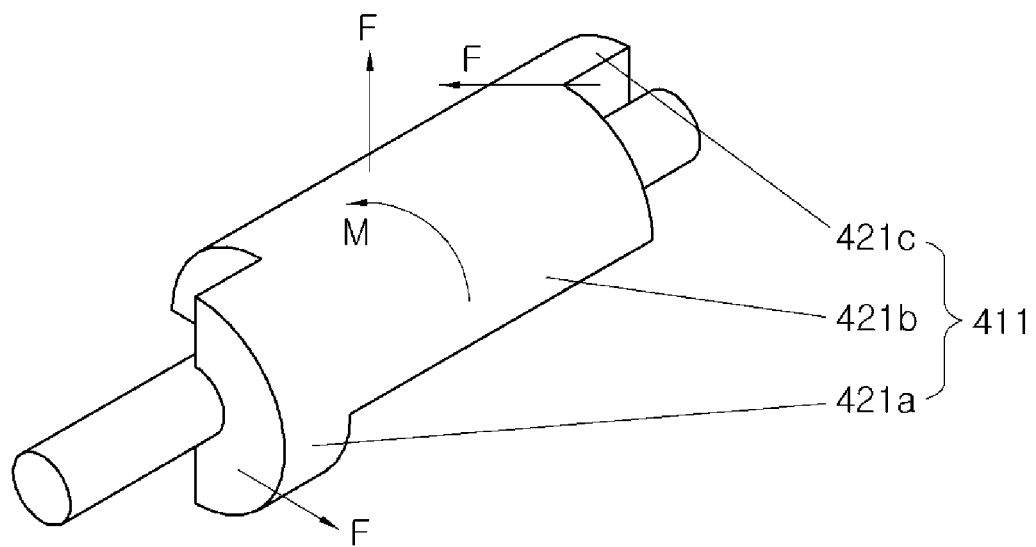

FIGS. 4A and 4B are perspective views of the first and second balance shafts which are applied to the balance shaft module of the engine according to the exemplary embodiment of the present invention. When first balance shaft 41 is rotated as illustrated in FIGS. 4A and 4B, an unbalance force F and an unbalance moment M are generated by first balance weight elements having first, second, and third weight elements 411a, 411b, and 411c provided on the outer circumference of first balance shaft 41. Similarly, an unbalance force F and an unbalance moment M are generated by second balance weight elements having fourth, fifth, and sixth weight elements 421a, 421b, and 421c on second balance shaft 42 which is rotated in the opposite direction at the same time as first balance shaft 41 is rotated.

In an exemplary embodiment of the present invention, the first, second and third weight elements 411a, 411b, and 411c have a 180 phase difference with the fourth, fifth and sixth weight elements 421a, 421b and 421c respectively.

In an exemplary embodiment of the present invention, the first, second and third weight elements 411a, 411b, and 411c have 90 degree phase difference in sequence.

In an exemplary embodiment of the present invention, the fourth, fifth and sixth weight elements 421a, 421b, and 421c have 90 degree phase difference in sequence.

An offsetting operation of unbalance forces F and unbalance moments M between first balance weight elements 411a, 411b, and 411c of first balance shaft 41 and second balance weight elements 421a, 421b, and 421c of second balance shaft 42 may be performed by unbalance forces F and unbalance moments M.

That is, FIGS. 4A and 4B illustrate that first and second balance shafts 41 and 42 are simultaneously rotated by the rotation of crank sprocket driving gear 10. As illustrated in FIGS. 4A and 4B, first balance weight elements 411a, 411b, and 411c are positioned in the opposite side of second balance weight elements 421a, 421b, and 421c while crank sprocket driving gear 10 is rotated. Accordingly, unbalance forces F and unbalance moments M, which are generated on first and second balance shafts 41 and 42, may be offset.

Figure 5:
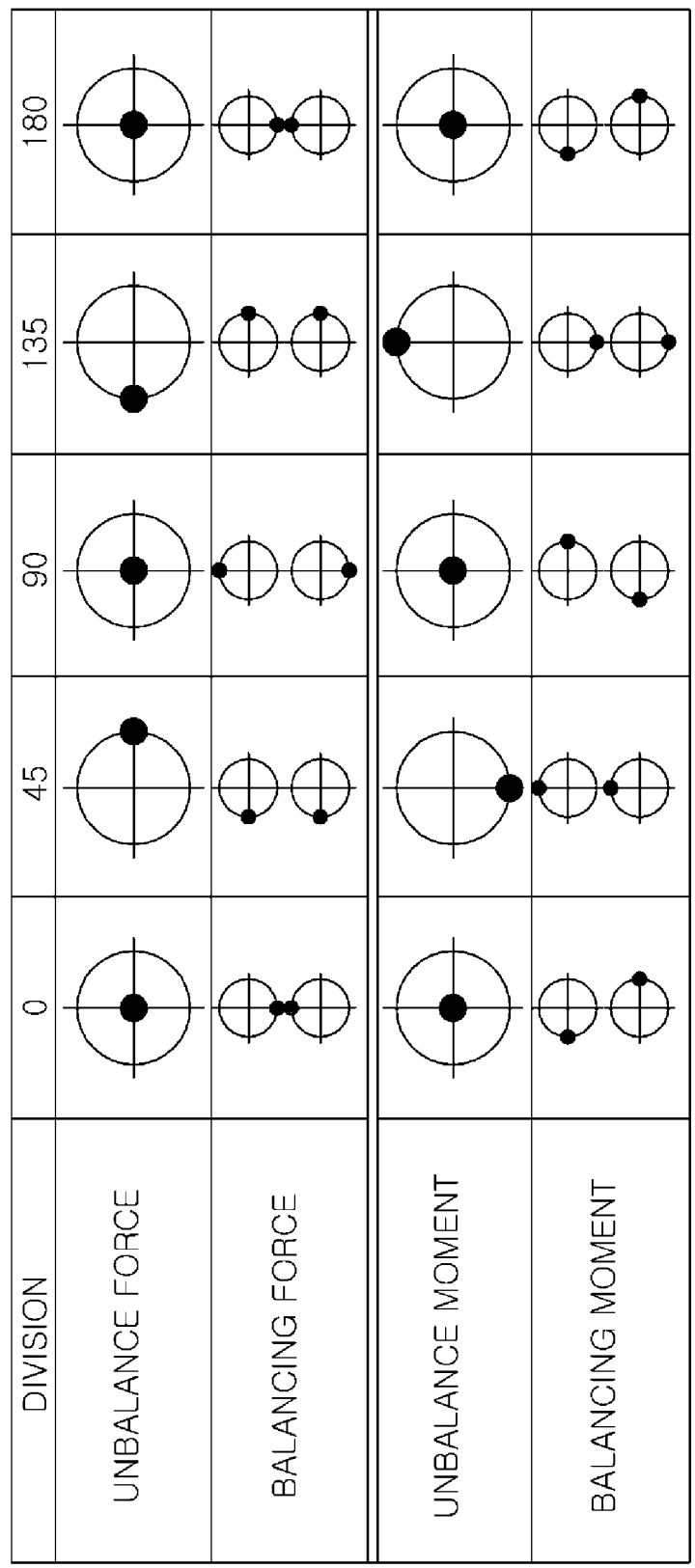
FIG. 5 schematically shows balancing for each rotation phase angle formed by the first and second balance shafts which are applied to the balance shaft module of the engine according to the exemplary embodiment of the present invention.

FIG. 5 schematically shows balancing for each rotation phase angle formed by the first and second balance shafts which are applied to the balance shaft module of the engine according to the exemplary embodiment of the present invention. As shown in FIG. 5, it can be seen that an unbalance force F of the crankshaft, which occurs according to the phase angle while the crankshaft is rotated, is offset by a balancing moment generated by a resultant force which is generated according to the positions of first balance weight elements 411a, 411b, and 411c and second balance weight elements 421a, 421b, and 421c. Here, first and second balance shafts 41 and 42 may be rotated at a speed two times higher than crank sprocket driving gear 10.

Although not illustrated, an oil pump may be further included. The oil pump may be arranged coaxially with the first or second balance shafts 41, 42 and rotated in a state of meshing with the first and second balance shafts. Such the oil pump may include a rotor formed therein and rotated on the same axis. Further, the oil pump can be modularized so as to be driven while being meshing with the first driving gear 31 and the second driven gear 32. Such the rotor is engaged with the first or second driving gear 31 or 32 so that the oil pump performs function of pumping.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A balance shaft module of an engine, comprising:
   a crank sprocket driving gear for receiving a power of a crankshaft of the engine;
   a crank sprocket driven gear operably engaged with the crank sprocket driving gear and receiving a power of the crank sprocket driving gear;
   a first balance shaft arranged coaxially with the crank sprocket driven gear and having a first driving gear to receive a power from the crank sprocket driven gear; and
   a second balance shaft receiving a power through a second driving gear engaged with the first driving gear;
   wherein a first balance weight element is mounted on the first balance shaft and includes first, second and third weight elements with a phase difference of 90 degrees in sequence;
   wherein a second balance weight element is mounted on the second balance shaft and includes fourth, fifth and sixth weight elements with a phase difference of 90 degrees in sequence; and
   wherein the first, second and third weight elements extend in an opposite direction than the fourth, fifth and sixth weight elements respectively, thereby offsetting unbalance forces and unbalance moments generated on the first balance shaft and the second balance shaft.

2. The balance shaft module as defined in claim 1, wherein a rotation speed of the crank sprocket driven gear is twice higher than that of the crank sprocket driving gear.

3. The balance shaft module as defined in claim 2, wherein virtual extension lines joining each rotation center of the first balance shaft, the second balance shaft, and the crank sprocket driving gear form an isosceles triangle.

4. The balance shaft module as defined in claim 3, wherein a distance between the rotation centers of the first balance shaft and the crank sprocket driving gear is equal to a distance between the rotation centers of the second balance shaft and the crank sprocket driving gear.

5. The balance shaft module as defined in claim 4, wherein a distance between the rotation centers of the first balance shaft and the second balance shaft is shorter than the distance between the rotation centers of the first balance shaft and the crank sprocket driving gear.

6. The balance shaft module as defined in claim 1, wherein the first and second balance shafts are disposed at a side surface of a cylinder block.

7. The balance shaft module as defined in claim 1, wherein the crank sprocket driving gear and the crank sprocket driven gear are connected through a chain member or a belt member.

* * * * *